United States Patent
Lin et al.

(10) Patent No.: US 12,537,581 B2
(45) Date of Patent: Jan. 27, 2026

(54) METHOD FOR PERFORMING BEAMFORMING SOUNDING FEEDBACK IN SYSTEM-PARAMETER-AWARE MANNER, AND ASSOCIATED APPARATUS

(71) Applicant: MEDIATEK INC., Hsin-Chu (TW)

(72) Inventors: Chun-Ting Lin, Hsinchu (TW);
Pu-Hsuan Lin, Hsinchu (TW);
Tsung-Hsuan Wu, Hsinchu (TW);
Hung-Tao Hsieh, Hsinchu (TW);
Yi-Cheng Huang, Hsinchu (TW);
Li-Tien Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 345 days.

(21) Appl. No.: 18/120,996

(22) Filed: Mar. 13, 2023

(65) Prior Publication Data
US 2023/0336230 A1 Oct. 19, 2023

Related U.S. Application Data

(60) Provisional application No. 63/331,356, filed on Apr. 15, 2022.

(51) Int. Cl.
*H04B 7/06* (2006.01)

(52) U.S. Cl.
CPC ......... *H04B 7/0634* (2013.01); *H04B 7/0617* (2013.01); *H04B 7/0658* (2013.01)

(58) Field of Classification Search
CPC ... H04B 7/0634; H04B 7/0617; H04B 7/0658
See application file for complete search history.

(56) References Cited

U.S. PATENT DOCUMENTS 8,180,314 B2 * 5/2012 Kim ............... H04B 7/0639
455/338
11,431,389 B1 * 8/2022 Sethi ............... H04B 7/0456
(Continued)

FOREIGN PATENT DOCUMENTS

| EP | 1 956 780 B1 | 7/2013 |
| TW | 202005307 A | 1/2020 |
| TW | 202015361 A | 4/2020 |

OTHER PUBLICATIONS

Eunsung Jeon et al., Adaptive Feedback of the Channel Information for Beamforming in IEEE 802.11ax WLANs, 2019, IEEE, XP033648163, 2019.

*Primary Examiner* — Asad M Nawaz
*Assistant Examiner* — Michael Wayne Maddox
(74) *Attorney, Agent, or Firm* — Winston Hsu (57) ABSTRACT

A method for performing beamforming sounding feedback in a system-parameter-aware manner and associated apparatus are provided. The method applicable to a wireless transceiver device within a wireless communications system may include: checking a plurality of system parameters of the wireless communications system to generate a plurality of checking results of the plurality of system parameters, respectively, wherein any checking result among the plurality of checking results indicates a current value of a corresponding system parameter among the plurality of system parameters; modifying a first beamforming feedback matrix according to the plurality of checking results to generate a second beamforming feedback matrix; and sending beamforming sounding feedback information carrying the second beamforming feedback matrix to another device within the wireless communications system, for further processing of the other device.

10 Claims, 5 Drawing Sheets

(56) References Cited

U.S. PATENT DOCUMENTS

| | | | |
|---|---|---|---|
| 11,824,606 B2* | 11/2023 | Ciochina | H04B 7/0634 |
| 11,973,547 B2* | 4/2024 | Yun | H04B 7/063 |
| 2006/0291544 A1* | 12/2006 | Fischer | H04W 80/00 |
| | | | 375/267 |
| 2011/0096755 A1* | 4/2011 | Clerckx | H04B 7/06952 |
| | | | 370/335 |
| 2013/0230079 A1 | 9/2013 | Solomon | |
| 2018/0138959 A1 | 5/2018 | Chun | |
| 2019/0146075 A1 | 5/2019 | Kravets | |
| 2019/0149280 A1 | 5/2019 | Seok | |
| 2020/0112353 A1* | 4/2020 | Liu | H04B 7/0632 |
| 2020/0336341 A1* | 10/2020 | Tian | H04L 25/0226 |
| 2023/0283324 A1* | 9/2023 | Tsodik | H04B 7/043 |
| | | | 375/262 |
| 2024/0204839 A1* | 6/2024 | Liu | H04B 7/0617 |

* cited by examiner

METHOD FOR PERFORMING BEAMFORMING SOUNDING FEEDBACK IN SYSTEM-PARAMETER-AWARE MANNER, AND ASSOCIATED APPARATUS

CROSS REFERENCE TO RELATED APPLICATIONS

This application claims the benefit of U.S. Provisional Application No. 63/331,356, filed on Apr. 15, 2022. The content of the application is incorporated herein by reference.

BACKGROUND

The present invention is related to communications control, and more particularly, to a method for performing beamforming sounding feedback in a system-parameter-aware manner, and associated apparatus such as a station (STA) device.

According to the related art, an access point (AP) device and a STA device within a wireless communications system may be configured to communicate with each other to provide a network service to a user. For example, the AP device may transmit a physical layer (PHY) protocol data unit (PPDU) using a beamforming steering matrix to the STA device, in order to achieve a better communications result. Some problems may occur, however. More particularly, in the architecture of the related art, the better communications result may not be achieved due to some unknown reasons. It seems that no proper suggestion has been proposed in the related art. Thus, a novel method and associated architecture are needed for solving the problem of the related art without introducing any side effect or in a way that is less likely to introduce a side effect.

SUMMARY

It is an objective of the present invention to provide a method for performing beamforming sounding feedback in a system-parameter-aware manner, and associated apparatus such as a STA device, in order to solve the above-mentioned problem.

It is another objective of the present invention to provide a method for performing beamforming sounding feedback in a system-parameter-aware manner, and associated apparatus such as a STA device, in order to enhance the overall performance.

At least one embodiment of the present invention provides a method for performing beamforming sounding feedback in a system-parameter-aware manner, where the method can be applied to a wireless transceiver device within a wireless communications system. For example, the method may comprise: checking a plurality of system parameters of the wireless communications system to generate a plurality of checking results of the plurality of system parameters, respectively, wherein any checking result among the plurality of checking results indicates a current value of a corresponding system parameter among the plurality of system parameters; modifying a first beamforming feedback matrix according to the plurality of checking results to generate a second beamforming feedback matrix; and sending beamforming sounding feedback information carrying the second beamforming feedback matrix to another device within the wireless communications system, for further processing of the other device.

At least one embodiment of the present invention provides a wireless transceiver device for performing beamforming sounding feedback in a system-parameter-aware manner, where the wireless transceiver device is one of multiple devices within a wireless communications system. The wireless transceiver device may comprise a processing circuit that is arranged to control operations of the wireless transceiver device. The wireless transceiver device may further comprise a communications control circuit that is coupled to the processing circuit and arranged to perform communications control, wherein the communications control circuit is arranged to perform wireless communications operations with another device among the multiple devices for the wireless transceiver device. For example, the wireless transceiver device is arranged to check a plurality of system parameters of the wireless communications system to generate a plurality of checking results of the plurality of system parameters, respectively, wherein any checking result among the plurality of checking results indicates a current value of a corresponding system parameter among the plurality of system parameters; the wireless transceiver device is arranged to modify a first beamforming feedback matrix according to the plurality of checking results to generate a second beamforming feedback matrix; and the wireless transceiver device is arranged to send beamforming sounding feedback information carrying the second beamforming feedback matrix to the other device within the wireless communications system, for further processing of the other device.

According to some embodiments, the apparatus may comprise at least one portion (e.g., a portion or all) of the wireless communications system. For example, the apparatus may represent a portion of the wireless communications system, such as the wireless transceiver device (e.g., a STA device). In some examples, the apparatus may represent the whole of the wireless communications system.

It is an advantage of the present invention that, through proper design, the present invention method, as well as the associated apparatus such as the wireless transceiver device, can determine the selected beamforming feedback matrix based on at least one predetermined system-parameter-to-matrix mapping rule (e.g., one or more predetermined system-parameter-to-matrix mapping rules), and more particularly, perform a mapping operation on the plurality of checking results to determine the beamforming feedback matrix, to make the other device (e.g., an AP device) operate correctly, in order to achieve a better communications result, and therefore enhance the overall performance. In addition, the present invention method and apparatus can solve the related art problem without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
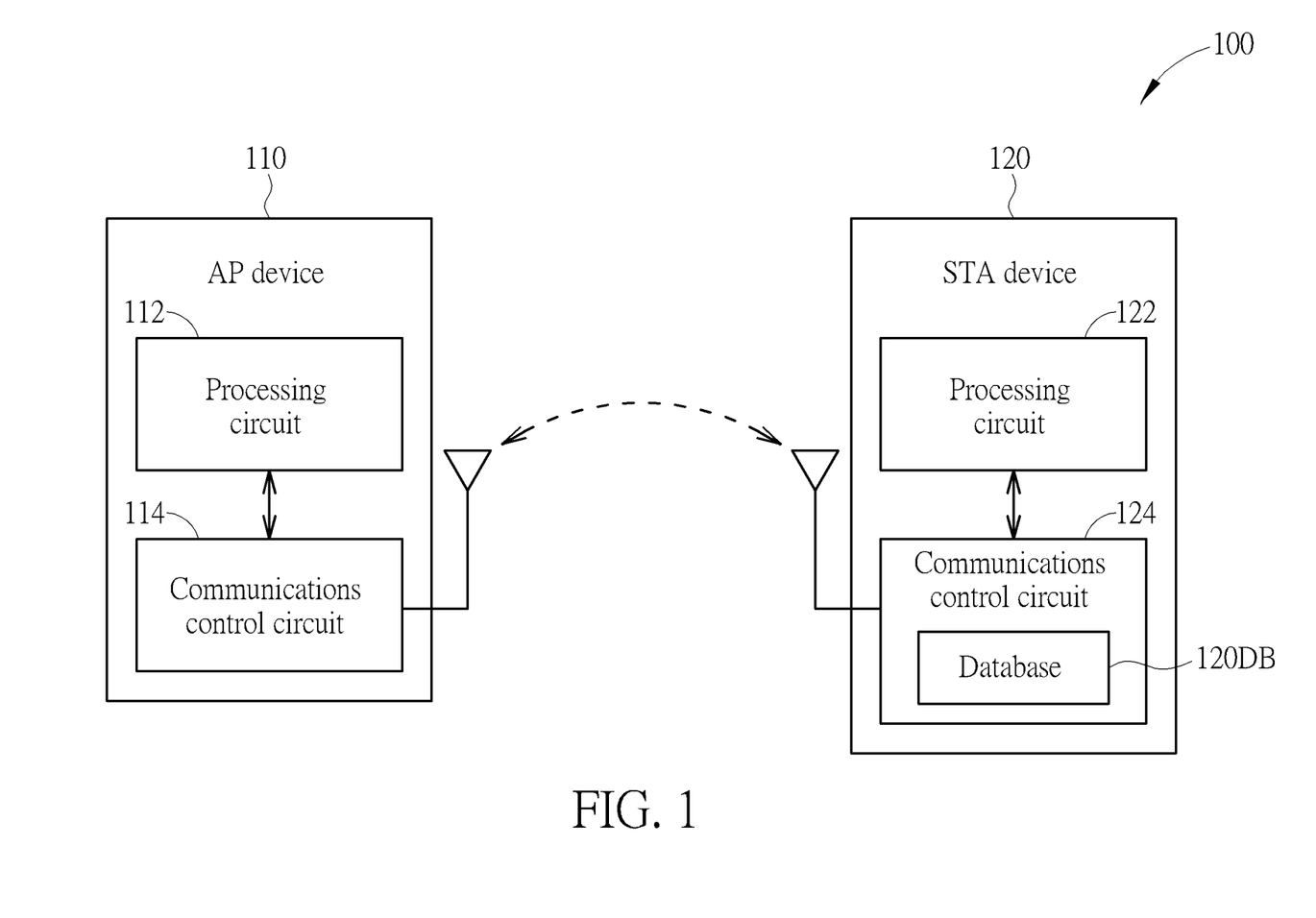
FIG. 1 is a diagram of a wireless communications system according to an embodiment of the present invention.

FIG. 1 is a diagram of a wireless communications system 100 according to an embodiment of the present invention. For better comprehension, the wireless communications system 100 (e.g., any device therein) may be compatible or back-compatible to one or more versions of the Institute of Electrical and Electronics Engineers (IEEE) 802.11 standards, but the present invention is not limited thereto. The wireless communications system 100 may comprise multiple devices such as multiple wireless transceiver devices. As shown in FIG. 1, the multiple devices (e.g., the multiple wireless transceiver devices) within the wireless communications system 100 may comprise the AP device 110 and the STA device 120, where the AP device 110 may comprise a processing circuit 112, at least one communications control circuit (e.g., one or more communications control circuits), which may be collectively referred to as the communications control circuit 114, and at least one antenna (e.g., one or more antennas) of the communications control circuit 114, and the STA device 120 may comprise a processing circuit 122, at least one communications control circuit (e.g., one or more communications control circuits), which may be collectively referred to as the communications control circuit 124, and at least one antenna (e.g., one or more antennas) of the communications control circuit 124.

In the architecture shown in FIG. 1, the processing circuit 112 can be arranged to control operations of the AP device 110 to make the AP device 110 act as an AP in the wireless communications system 100, and the communications control circuit 114 can be arranged to perform communications control, and more particularly, perform wireless communications operations with the STA device 120 (e.g., the communications control circuit 124 thereof) for the AP device 110. In addition, the processing circuit 122 can be arranged to control operations of the STA device 120 to make the STA device 120 act as an STA in the wireless communications system 100, and the communications control circuit 124 can be arranged to perform communications control, and more particularly, perform wireless communications operations with the AP device 110 (e.g., the communications control circuit 114 thereof) for the STA device 120.

The STA device 120 may comprise a predetermined database related to beamforming sounding feedback control. As shown in FIG. 1, the predetermined database may be implemented as a system-parameter-to-matrix mapping database 120DB (labeled "Database" for brevity) within the communications control circuit 124, where the communications control circuit 124 may operate according to the system-parameter-to-matrix mapping database 120DB, but the present invention is not limited thereto. According to some embodiments, the system-parameter-to-matrix mapping database 120DB may be stored in a non-volatile memory, such as an electronically erasable programmable read-only memory (EEPROM) or a flash memory, and the STA device 120 (e.g., the processing circuit 122) may operate according to the system-parameter-to-matrix mapping database 120DB.

According to some embodiments, the processing circuit 112 can be implemented by way of at least one processor/microprocessor, at least one random access memory (RAM), at least one bus, etc., and the communications control circuit 114 can be implemented by way of at least one wireless network control circuit and at least one wired network control circuit, but the present invention is not limited thereto. Examples of the AP device 110 may include, but are not limited to: a Wi-Fi router. In addition, the processing circuit 122 can be implemented by way of at least one processor/microprocessor, at least one RAM, at least one bus, etc., and the communications control circuit 124 can be implemented by way of at least one wireless network control circuit, but the present invention is not limited thereto. Examples of the STA device 120 may include, but are not limited to: a multifunctional mobile phone, a laptop computer, an all-in-one computer and a wearable device.

Figure 2:
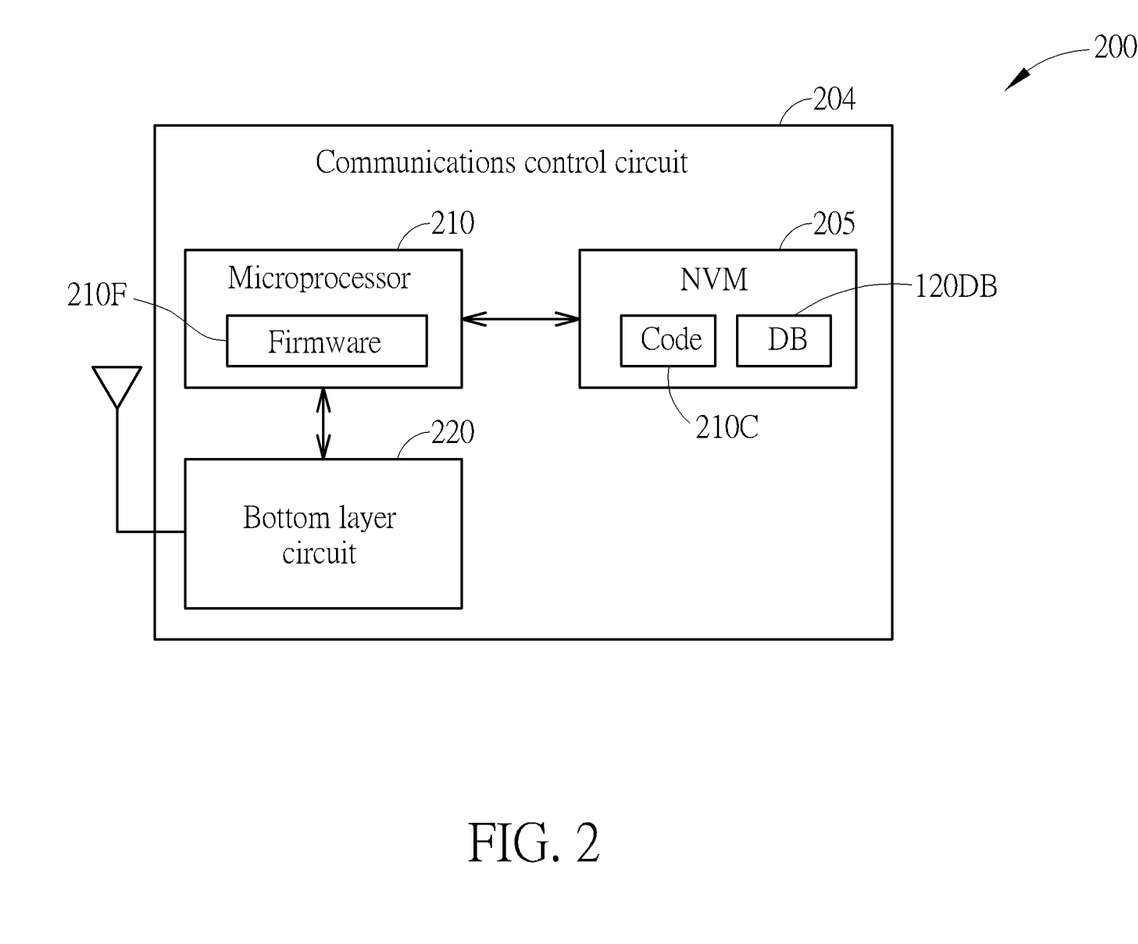
FIG. 2 is a diagram illustrating a wireless transceiver device comprising a communications control circuit according to an embodiment of the present invention.

FIG. 2 is a diagram illustrating a wireless transceiver device 200 comprising a communications control circuit 204 according to an embodiment of the present invention, where the wireless transceiver device 200 and the communications control circuit 204 therein can be taken as examples of the STA device 120 shown in FIG. 1 and the communications control circuit 124 therein, respectively. The communications control circuit 204 may comprise a non-volatile memory 205 (labeled "NVM" for brevity), such as an EEPROM or a flash memory, where the system-parameter-to-matrix mapping database 120DB (labeled "DB" for brevity") may be stored in the non-volatile memory 205. The communications control circuit 204 may further comprise a microprocessor 210 and a bottom layer circuit 220 (e.g., a PHY circuit). In addition, the non-volatile memory 205 may be arranged to store a set of program codes 210C (labeled "Code" for brevity) corresponding to multiple functions of the communications control circuit 204, and the microprocessor 210 may load the set of program codes 210C from the non-volatile memory 205 to be a firmware module 210F (labeled "Firmware" for brevity") running on the microprocessor 210, for controlling the bottom layer circuit 220 to provide the multiple functions mentioned above. For example, the firmware module 210F running on the microprocessor 210 may load the system-parameter-to-matrix mapping database 120DB from the non-volatile memory 205 and operate according to the system-parameter-to-matrix mapping database 120DB.

In the embodiment shown in FIG. 2, the system-parameter-to-matrix mapping database 120DB may be stored in the non-volatile memory 205 within the communications control circuit 204, but the present invention is not limited thereto. According to some embodiments, the architecture shown in FIG. 2 may vary.

Figure 3:
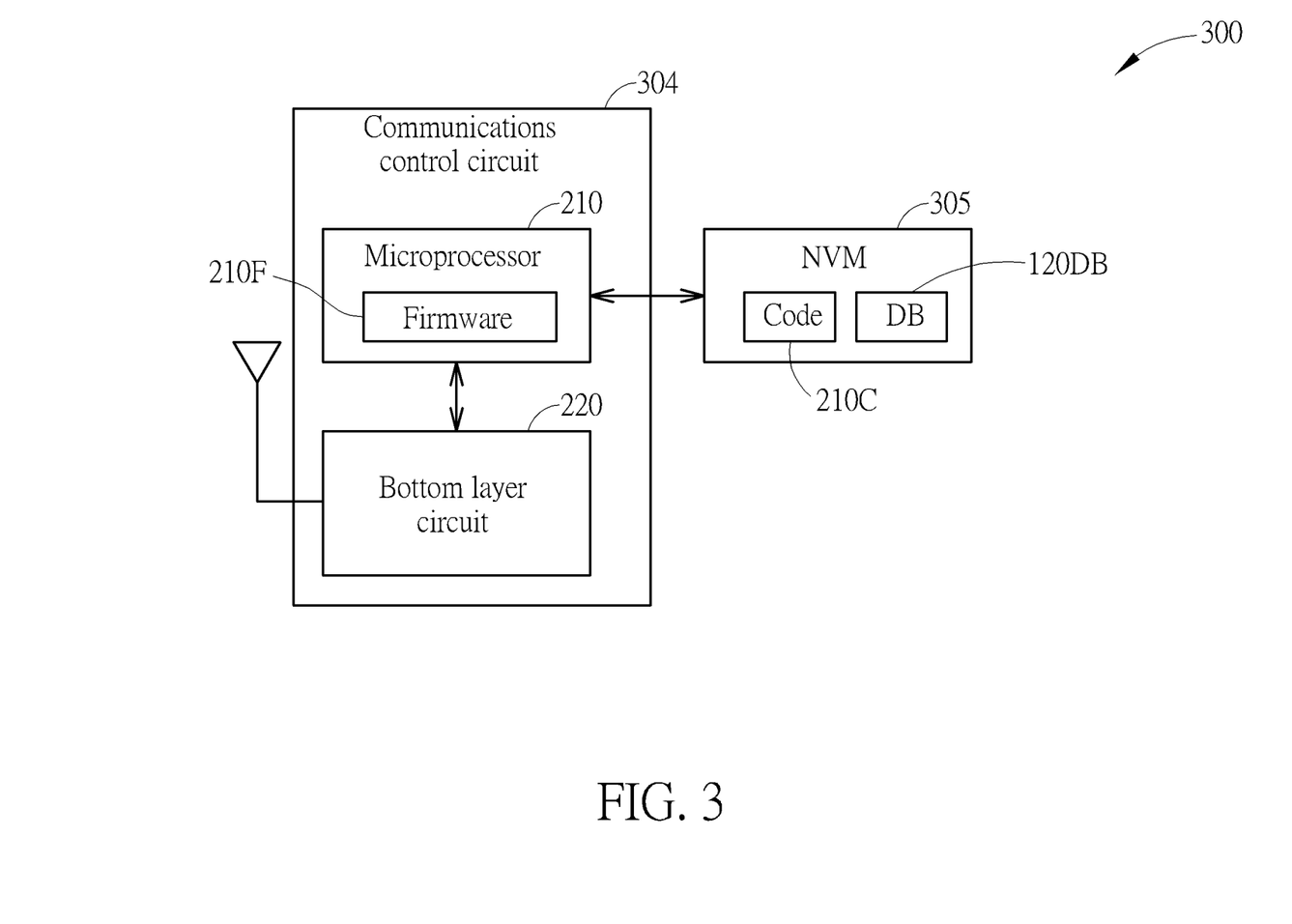
FIG. 3 is a diagram illustrating a wireless transceiver device comprising a communications control circuit according to another embodiment of the present invention.

FIG. 3 is a diagram illustrating a wireless transceiver device 300 comprising a communications control circuit 304 according to another embodiment of the present invention, where the wireless transceiver device 300 and the communications control circuit 304 therein can be taken as examples of the STA device 120 shown in FIG. 1 and the communications control circuit 124 therein, respectively. In comparison with the embodiment shown in FIG. 2, the non-volatile memory 205 mentioned above may be replaced with a non-volatile memory 305 (labeled "NVM" for brevity") positioned outside the communications control circuit 304 as shown in FIG. 3, for storing the system-parameter-to-matrix mapping database 120DB and the set of program codes 210C (respectively labeled "DB" and "Code" for brevity"). For example, the non-volatile memory 305 may be implemented by way of an EEPROM or a flash memory. In addition, the microprocessor 210 may load the set of program codes 210C from the non-volatile memory 305 to be the firmware module 210F (labeled "Firmware" for brevity") running on the microprocessor 210. For example, the firmware module 210F running on the microprocessor 210 may load the system-parameter-to-matrix mapping database 120DB from the non-volatile memory 305 and operate according to the system-parameter-to-matrix mapping database 120DB, but the present invention is not limited thereto. According to some embodiments, the architecture shown in FIG. 3 may vary.

According to some embodiments, the firmware processing architecture that operates under control of the firmware module 210F (e.g., the architecture shown in any of FIG. 2 and FIG. 3) may be replaced with any of some other types of architectures. For example, the firmware processing architecture may be replaced with a digital processing processor (DSP) architecture, where the corresponding communications control circuit among the communications control circuits 204 and 304 may be implemented with a DSP. For another example, the firmware processing architecture may be replaced with a hardware architecture, where the corresponding non-volatile memory among the non-volatile memories 205 and 305 may be replaced with a read-only memory (ROM). More particularly, the set of program codes 210C stored in the ROM, such as a set of ROM codes, may be loaded from the ROM, and the firmware module 210F running on the microprocessor 210 may be replaced with the set of ROM codes loaded from the ROM.

Figure 4:
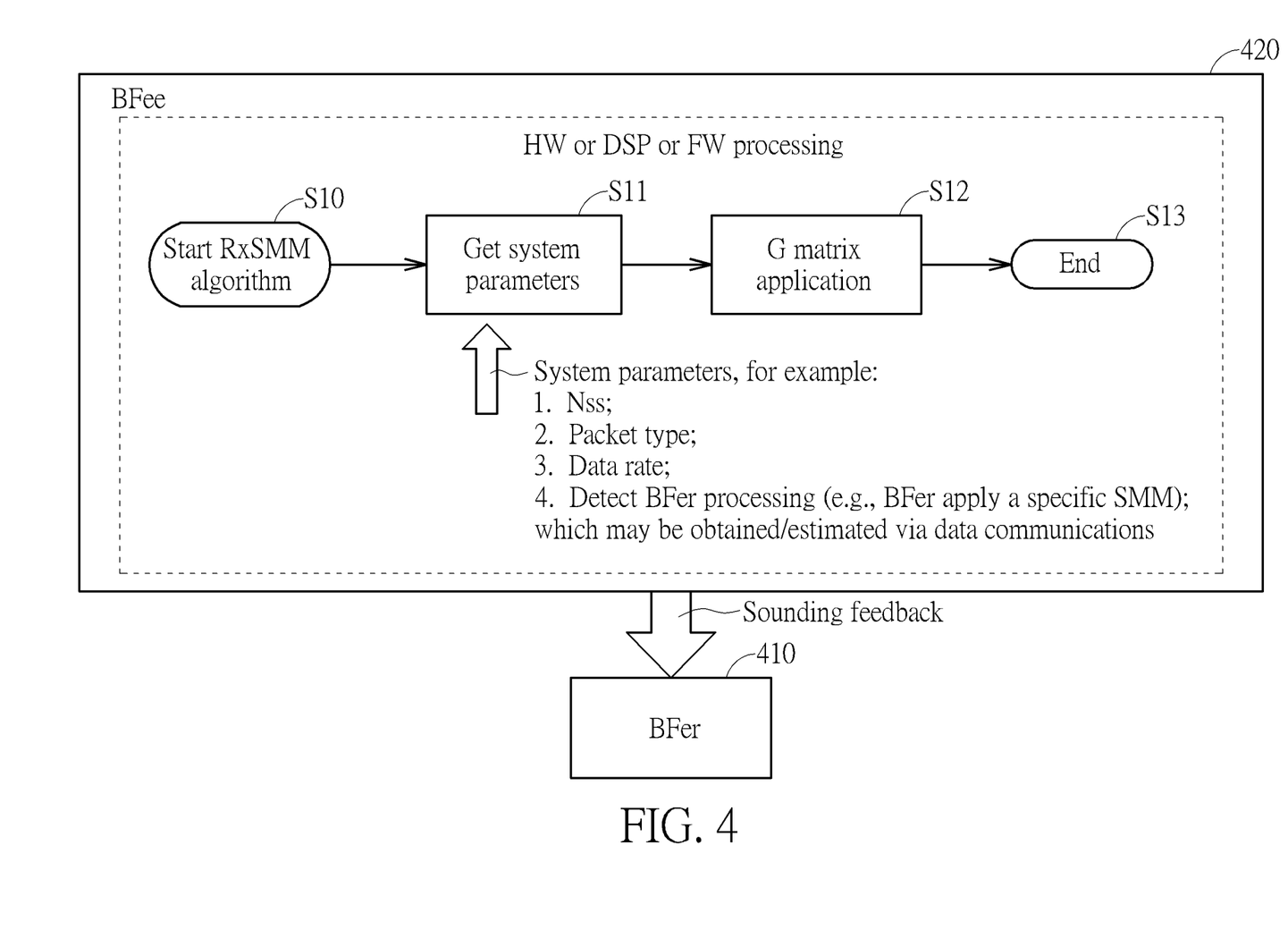
FIG. 4 is a diagram illustrating a system-parameter-aware beamformee (BFee)-side spatial multiplexing modulation (SMM) control scheme of a method for performing beamforming sounding feedback in a system-parameter-aware manner according to an embodiment of the present invention.

FIG. 4 is a diagram illustrating a system-parameter-aware BFee-side SMM control scheme of a method for performing beamforming sounding feedback in a system-parameter-aware manner according to an embodiment of the present invention. The method is applicable to a wireless transceiver device within the wireless communications system 100, such as the STA device 120 shown in FIG. 1, where the AP device 110 and the STA device 120 shown in FIG. 1 may act as a beamformer (BFer) 410 and a BFee 420, respectively, but the present invention is not limited thereto. In addition, the BFee 420 operating according to the system-parameter-aware BFee-side SMM control scheme can properly prepare a sounding feedback and send the sounding feedback to the BFer 410, in order to enhance the overall performance.

In Step S10, the BFee 420 may start performing operations of a system-parameter-aware BFee-side SMM algorithm corresponding to the system-parameter-aware BFee-side SMM control scheme (labeled "Start RxSMM algorithm" for brevity), for example, by utilizing any architecture among the hardware architecture, the DSP architecture and the firmware processing architecture (labeled "HW or DSP or FW processing" for brevity).

In Step S11, the BFee 420 may get a plurality of system parameters of the wireless communications system 100, and more particularly, obtain and/or estimate the plurality of system parameters via data communications between the BFer 410 and the BFee 420. Examples of the plurality of system parameters may include, but are not limited to: a number of spatial streams (NSS) such as Nss (or $N_{ss}$), a packet type, a data rate, a modulation and coding scheme (MCS) (e.g., a MCS index thereof), and some system parameters obtainable from detecting BFer processing of the BFer 410 (for example, the BFer 410 may apply a specific SMM).

The BFee 420 may refer to the plurality of system parameters to make a sounding feedback profile (e.g., the profile of the sounding feedback) be related to the plurality of system parameters, not only considering the physical channel, and more particularly, determine the sounding feedback profile according to both of the physical channel (e.g., the latest feature(s) thereof) and the plurality of system parameters, where the sounding feedback profile may change with respect to the plurality of system parameters, but the present invention is not limited thereto. For example, the BFee 420 may determine the sounding feedback profile according to the physical channel (e.g., the latest feature(s) thereof) and further fine-tune the sounding feedback profile according to the plurality of system parameters. In addition, in comparison with any BFee operating according to only a system-parameter-unaware BFee-side SMM control scheme, the BFee 420 operating according to the system-parameter-aware BFee-side SMM control scheme can optimize the sounding feedback profile according to the plurality of system parameters in order to get a better receiver (Rx) sensitivity, even under the same physical channel.

Regarding the Rx sensitivity, the Rx side such as the BFee 420 may compare the Rx sensitivity with a predetermined Rx sensitivity level to determine whether the Rx sensitivity reaches the predetermined Rx sensitivity level, for determining whether the demodulation of the received data would be successful. For example, the BFee 420 may determine whether the Rx sensitivity reaches a first predetermined Rx sensitivity level corresponding to a first MCS (e.g., MCS=10) for determining whether the demodulation of the data that has been processed with the first MCS would be successful. For another example, the BFee 420 may determine whether the Rx sensitivity reaches a second predetermined Rx sensitivity level corresponding to a second MCS (e.g., MCS=11) for determining whether the demodulation of the data that has been processed with the second MCS would be successful. In addition, the BFee 420 may calculate a packet error rate (PER) of a PPDU, such as the ratio of the number of incorrect MPDUs (e.g., MPDUs with errors) in the PPDU to the number of all MPDUs in the PPDU, where the PER may indicate the Rx sensitivity. For a certain MCS (e.g., MCS=11), the BFee 420 may determine whether the PER is less than a predetermined PER threshold (e.g., 10%) to determine whether the Rx sensitivity reaches the predetermined Rx sensitivity level. For example, if the PER is less than the predetermined PER threshold, the BFee 420 may determine that the Rx sensitivity reaches the predetermined Rx sensitivity level; otherwise, the BFee 420 may determine that the Rx sensitivity does not reach the predetermined Rx sensitivity level. As the BFee 420 operating according to the system-parameter-aware BFee-side SMM control scheme is capable of optimizing the sounding feedback profile, the BFee 420 can get the better Rx sensitivity. For example, the method may be regarded as a receiver/BFee-side SMM method, which may be referred to as the Rx-SMM method for brevity.

In Step S12, the BFee 420 may perform G matrix application, and more particularly, determine a beamforming feedback matrix V and optimize the beamforming feedback matrix V to generate the sounding feedback profile that is optimized, for example, by generating an optimized beamforming feedback matrix Vg as a replacement of the original beamforming feedback matrix V. The BFee 420 may determine the channel model type (e.g., the type of channel model of the physical channel, such as one of multiple predetermined types) to determine the beamforming feedback matrix V based on the channel model type as usual first, for example, according to the system-parameter-unaware BFee-side SMM control scheme mentioned above, and further apply a unitary rotation based on the plurality of system parameters to the beamforming feedback matrix V to generate the optimized beamforming feedback matrix Vg as follows:

$$Vg = V * G;\qquad\text{Eq (1)}$$

where G is a unitary rotation matrix. For example, the unitary rotation matrix G may vary with respect to the plurality of system parameters according to at least one predetermined system-parameter-to-matrix mapping rule (e.g., one or more predetermined system-parameter-to-matrix mapping rules), to make the optimized beamforming feedback matrix Vg vary with respect to the plurality of system parameters according to the aforementioned at least one predetermined system-parameter-to-matrix mapping rule, where the aforementioned at least one predetermined system-parameter-to-matrix mapping rule may be implemented with a predetermined database such as the system-parameter-to-matrix mapping database 120DB, but the present invention is not limited thereto. For another example, the optimized beamforming feedback matrix Vg may vary with respect to the plurality of system parameters according to the aforementioned at least one predetermined system-parameter-to-matrix mapping rule. As the plurality of system parameters may vary in different situations, the BFee 420 may apply different unitary rotation operations based on the system parameters to generate the optimized beamforming feedback matrix Vg corresponding to the system parameters in different situations, respectively, in order to keep achieving the best Rx sensitivity.

In Step S13, the BFee 420 may complete the operations of the system-parameter-aware BFee-side SMM algorithm corresponding to the system-parameter-aware BFee-side SMM control scheme (labeled "End" for brevity), for example, by sending the sounding feedback (e.g., beamforming sounding feedback information such as compressed beamforming report information) having the optimized sounding feedback profile to the BFer 410, where the sounding feedback may carry the optimized beamforming feedback matrix Vg instead of the original beamforming feedback matrix V.

Typically, a conventional sounding feedback generated by the aforementioned any BFee operating according to only the system-parameter-unaware BFee-side SMM control scheme only depends on the physical channel. The BFee 420 operating according to the system-parameter-aware BFee-side SMM control scheme can determine the optimized beamforming feedback matrix Vg based on the aforementioned at least one predetermined system-parameter-to-matrix mapping rule, and send the sounding feedback carrying the optimized beamforming feedback matrix Vg to make the BFer 410 to operate correctly, in order to achieve a better communications result, and therefore enhance the overall performance.

According to some embodiments, the method is applicable to at least one other device (e.g., one or more other devices) within the wireless communications system 100. For example, the wireless communications system 100 may comprise multiple STA devices {120} such as the STA device 120 shown in FIG. 1, and the method can be applied to any STA device 120 among the multiple STA devices {120} within the wireless communications system 100, where the AP device 110 and the aforementioned any STA device 120 may act as the BFer 410 and the BFee 420, respectively. In this situation, the communications control circuit 124 in the aforementioned any STA device 120 therein can be implemented by way of the firmware processing architecture shown in any of FIG. 2 and FIG. 3, the DSP architecture, or the hardware architecture. For another example, the wireless communications system 100 may comprise multiple AP devices {110} such as the AP device 110 shown in FIG. 1, and the method can be applied to any AP device 110 among the multiple AP devices {110} within the wireless communications system 100, where the aforementioned any AP device 110 and another AP device among the multiple AP devices {110} may act as the BFee 420 and the BFer 410, respectively. In this situation, the communications control circuit 114 in the aforementioned any AP device 110 can be implemented by way of the firmware processing architecture shown in any of FIG. 2 and FIG. 3, the DSP architecture, or the hardware architecture.

Figure 5:
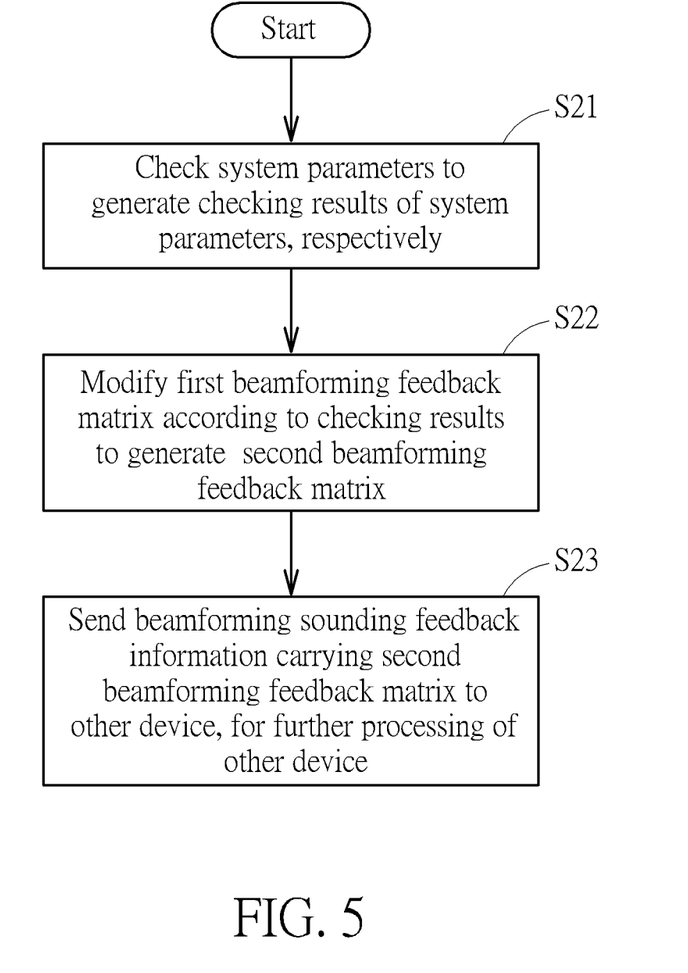
FIG. 5 illustrates a working flow of the method according to an embodiment of the present invention.

FIG. 5 illustrates a working flow of the method according to an embodiment of the present invention. For example, any wireless transceiver device (e.g., the STA device 120) among the multiple wireless transceiver devices within the wireless communications system 100 may act as the BFee 420, and another device (e.g., the AP device 110) among the multiple wireless transceiver devices may act as the BFer 410.

In Step S21, the wireless transceiver device acting as the BFee 420 may check the plurality of system parameters of the wireless communications system 100 to generate a plurality of checking results of the plurality of system parameters, respectively, where any checking result among the plurality of checking results may correspond (e.g., indicate or represent) a current value of a corresponding system parameter among the plurality of system parameters, such as the latest value of the corresponding system parameter. As a result, the plurality of checking results may correspond (e.g., indicate or represent) the current values of the plurality of system parameters, such as the latest values of the plurality of system parameters, respectively, to allow the BFee 420 to be system-parameter-aware (e.g., aware of the plurality of system parameters) and modify or optimize the sounding feedback profile (e.g., the beamforming feedback matrix V) before sending the sounding feedback to the BFer 410, in order to get the better Rx sensitivity.

The BFee 420 may obtain and/or estimate the plurality of system parameters (e.g., the current values or the latest values thereof) via data communications between the BFer 410 and the BFee 420 to get the plurality of system parameters as mentioned in Step S11. For better comprehension, the BFer 410 may transmit at least one PPDU (e.g., one or more PPDUs) to one or more other devices within the wireless communications system 100, such as the BFee 420, and the BFee 420 may receive the aforementioned at least one PPDU from the BFer 410 and obtain at least one first system parameter (e.g., one or more first system parameters) among the plurality of system parameters from the aforementioned at least one PPDU, where the aforementioned at least one PPDU may carry the aforementioned at least one first system parameter. In addition, the BFee 420 may estimate at least one second parameter (e.g., one or more second system parameters) among the plurality of system parameters by itself, rather than obtaining the aforementioned at least one second parameter directly from the aforementioned at least one PPDU, and more particularly, detect the BFer processing of the BFer 410 to determine the aforementioned at least one second parameter.

In Step S22, the wireless transceiver device acting as the BFee 420 may modify a first beamforming feedback matrix such as the beamforming feedback matrix V according to the plurality of checking results (e.g., the latest values of the plurality of system parameters) to generate a second beamforming feedback matrix such as the optimized beamforming feedback matrix Vg. More particularly, based on the aforementioned at least one predetermined system-parameter-to-matrix mapping rule, which may be implemented with the predetermined database such as the system-parameter-to-matrix mapping database 120DB, the wireless transceiver device acting as the BFee 420 may perform a mapping operation on the plurality of checking results to determine a selected unitary rotation matrix G among a plurality of predetermined unitary rotation matrices {G}, and modify the first beamforming feedback matrix such as the beamforming feedback matrix V according to the selected unitary rotation matrix G to generate the second beamforming feedback matrix such as the optimized beamforming feedback matrix Vg, where the selected unitary rotation matrix G may be selected from the plurality of predetermined unitary rotation matrices {G}.

For example, the predetermined database such as the system-parameter-to-matrix mapping database 120DB may comprise a plurality of predetermined system-parameter-to-matrix mapping relationships between respective candidate values of the plurality of system parameters and the plurality of predetermined unitary rotation matrices. The plurality of predetermined system-parameter-to-matrix mapping relationships may indicate statistical results with regard to a plurality of predetermined channel models, and may be obtained from experiments in advance, for example, in at least one preliminary phase (e.g., one or more preliminary phases) before a mass production phase among multiple phases of the wireless transceiver device acting as the BFee 420, where the aforementioned at least one preliminary phase may comprise a design phase and/or a pilot run phase. In addition, the wireless transceiver device acting as the BFee 420 may refer to at least one system-parameter-to-matrix mapping relationship (e.g., one or more system-parameter-to-matrix mapping relationships) among the plurality of predetermined system-parameter-to-matrix mapping relationships to perform the mapping operation mentioned above, to determine the selected unitary rotation matrix G, for generating the optimized beamforming feedback matrix Vg according to the selected unitary rotation matrix G (e.g., Vg=V*G).

In Step S23, the wireless transceiver device acting as the BFee 420 may send the beamforming sounding feedback information carrying the second beamforming feedback matrix such as the optimized beamforming feedback matrix Vg to the other device acting as the BFer 410, for further processing of the other device acting as the BFer 410. For example, the beamforming sounding feedback information may comprise the compressed beamforming report information, and the second beamforming feedback matrix such as the optimized beamforming feedback matrix Vg may be carried by the compressed beamforming report information.

TABLE 1

| Field | Size (bits) | Meaning |
|---|---|---|
| Average SNR of Space-Time Stream 1 | 8 | Signal-to-noise ratio at the beamformee for space-time stream 1 averaged over all data subcarriers |
| . . . | . . . | . . . |
| Average SNR of Space-Time Stream Nc | 8 | Signal-to-noise ratio at the beamformee for space-time stream Nc averaged over all data subcarriers |
| Compressed beamforming feedback matrix V for subcarrier k = scidx(0) | Na × $(b_\phi + b_\psi)/2$ | Compressed beamforming feedback matrix |
| Compressed beamforming feedback matrix V for subcarrier k = scidx(1) | Na × $(b_\phi + b_\psi)/2$ | Compressed beamforming feedback matrix |
| . . . | | . . . |
| Compressed beamforming feedback matrix V for subcarrier k = scidx(Ns − 1) | Na × $(b_\phi + b_\psi)/2$ | Compressed beamforming feedback matrix |

TABLE 2

| Field | Size (bits) | Meaning |
|---|---|---|
| Average SNR of Space-Time Stream 1 | 8 | Signal-to-noise ratio at the beamformee for space-time stream 1 averaged over all data subcarriers |
| . . . | | . . . |
| Average SNR of Space-Time Stream Nc | 8 | Signal-to-noise ratio at the beamformee for space-time stream Nc averaged over all data subcarriers |
| Compressed beamforming feedback matrix Vg for subcarrier k = scidx(0) | Na × $(b_\phi + b_\psi)/2$ | Compressed beamforming feedback matrix |

TABLE 2-continued

| Field | Size (bits) | Meaning |
| --- | --- | --- |
| Compressed beamforming feedback matrix Vg for subcarrier k = scidx(1) | Na × $(b_\phi + b_\psi)/2$ | Compressed beamforming feedback matrix |
| ... | | ... |
| Compressed beamforming feedback matrix Vg for subcarrier k = scidx(Ns − 1) | Na × $(b_\phi + b_\psi)/2$ | Compressed beamforming feedback matrix |

Table 1 illustrates an example of High Efficiency (HE) Compressed Beamforming Report information, and Table 2 illustrates another example of the HE Compressed Beamforming Report information, where the symbol " . . . " may indicate that some table contents may be omitted, and the associated parameters such as the number of angles used for the compressed beamforming feedback matrix, i.e., Na, the number of subcarriers for which the compressed beamforming feedback matrix is sent back to the BFer, i.e., Ns, the subcarrier indices {scidx( )}, etc. may be the same as that defined in the one or more versions of the IEEE 802.11 standards. Table 2 is different from Table 1 in some fields. As shown in Table 2, the compressed beamforming feedback matrices {V} that appear in Table 1 have been replaced with the compressed beamforming feedback matrices {Vg}. In addition, the beamforming feedback matrix V in the equation Eq(1) may represent a compressed beamforming feedback matrix V for a subcarrier k (e.g., k=scidx(0), scidx(1), . . . or scidx(Ns−1)) among the compressed beamforming feedback matrices {V} shown in Table 1, and the optimized beamforming feedback matrix Vg in the equation Eq(1) may represent a corresponding compressed beamforming feedback matrix Vg for the same subcarrier k (e.g., k=scidx(0), scidx(1), . . . or scidx(Ns−1)) among the compressed beamforming feedback matrices {Vg} shown in Table 2. Please note that the HE Compressed Beamforming Report information may be taken as an example for indicating that the method can be applied to the architecture of Wi-Fi 6/IEEE 802.11ax (also known as HE), but the present invention is not limited thereto. According to some embodiments, the method can be applied to any of various architectures such as that of Wi-Fi 4/IEEE 802.11n (also known as High Throughput (HT)), Wi-Fi 5/IEEE 802.11ac (also known as Very High Throughput (VHT)), Wi-Fi 6/IEEE 802.11ax, Wi-Fi 6E as part of Wi-Fi 6 (for offering the features and capabilities of Wi-Fi 6, extended to the 6 gigahertz (GHz) band), Wi-Fi 7/IEEE 802.11be (also known as Extremely High Throughput (EHT)), etc., and more particularly, are expected to be applicable to any architecture of Wi-Fi 8 and beyond in the future.

For better comprehension, assume that one or more functions of the BFee 420, such as a system-parameter-aware BFee-side e SMM control function corresponding to the system-parameter-aware BFee-side SMM control scheme shown in FIG. 4, may be temporarily disabled, but the present invention is not limited thereto.

For example, when the system-parameter-aware BFee-side SMM control function is temporarily disabled, the BFee 420 may skip performing the operations of Steps S21 and S22, and send the beamforming sounding feedback information (e.g., the HE Compressed Beamforming Report information shown in Table 1) carrying the first beamforming feedback matrix such as the original beamforming feedback matrix V (e.g., the compressed beamforming feedback matrices {V} shown in Table 1) to the BFer 410, for further processing of the BFer 410. As the optimized beamforming feedback matrix Vg is not generated in this situation, the beamforming sounding feedback information sent to the BFer 410 by the BFee 420 may merely carry the original beamforming feedback matrix V that has not been optimized according to the plurality of system parameters. For another example, the BFee 420 that operates according to the system-parameter-aware BFee-side SMM control scheme without disabling the system-parameter-aware BFee-side SMM control function may perform the operations of Steps S21, S22 and S23, and more particularly, send the beamforming sounding feedback information (e.g., the HE Compressed Beamforming Report information shown in Table 2) carrying the second beamforming feedback matrix such as the optimized beamforming feedback matrix Vg (e.g., the compressed beamforming feedback matrices {Vg} shown in Table 2) to the BFer 410, for further processing of the BFer 410, where the compressed beamforming report information mentioned above may be implemented by way of the HE Compressed Beamforming Report information shown in Table 2.

As the wireless transceiver device acting as the BFee 420 is capable of carrying the second beamforming feedback matrix such as the optimized beamforming feedback matrix Vg (e.g., the compressed beamforming feedback matrices {Vg} shown in Table 2) in the beamforming sounding feedback information (e.g., the HE Compressed Beamforming Report information shown in Table 2) transmitted to the other device acting as the BFer 410, to make the BFer 410 perform beamforming according to the optimized beamforming feedback matrix Vg, the wireless communications system 100 that operates according to the method can enhance the overall performance.

For better comprehension, the method may be illustrated with the working flow shown in FIG. 5, but the present invention is not limited thereto. According to some embodiments, one or more steps may be added, deleted, or changed in the working flow shown in FIG. 5.

According to some embodiments, the wireless transceiver device acting as the BFee 420 may be arranged to carry multiple second beamforming feedback matrices such as multiple optimized beamforming feedback matrices {Vg} (e.g., the compressed beamforming feedback matrices {Vg} shown in Table 2) in the beamforming sounding feedback information (e.g., the HE Compressed Beamforming Report information shown in Table 2) transmitted to the other device acting as the BFer 410, to make the BFer 410 perform beamforming according to the multiple optimized beamforming feedback matrices {Vg}, where the multiple second beamforming feedback matrices such as multiple optimized beamforming feedback matrices {Vg} may comprise the second beamforming feedback matrix such as the optimized beamforming feedback matrix Vg. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing beamforming sounding feedback in a system-parameter-aware manner, the method being applied to a wireless transceiver device within a wireless communications system, the method comprising:

checking a plurality of system parameters of the wireless communications system to generate a plurality of checking results of the plurality of system parameters, respectively, wherein any checking result among the plurality of checking results indicates a current value of a corresponding system parameter among the plurality of system parameters, and the plurality of system parameters comprise one or a combination of a number of spatial streams (NSS), a modulation and coding scheme (MCS), and a data rate;

modifying a first beamforming feedback matrix according to the plurality of checking results to generate a second beamforming feedback matrix, wherein modifying the first beamforming feedback matrix according to the plurality of checking results to generate the second beamforming feedback matrix further comprises:

based on at least one predetermined system-parameter-to-matrix mapping rule, performing a mapping operation on the plurality of checking results to determine a selected unitary rotation matrix among a plurality of predetermined unitary rotation matrices, wherein the selected unitary rotation matrix is selected from the plurality of predetermined unitary rotation matrices; and modifying the first beamforming feedback matrix according to the selected unitary rotation matrix to generate the second beamforming feedback matrix; and sending beamforming sounding feedback information carrying the second beamforming feedback matrix to another device within the wireless communications system, for further processing of the other device.

2. The method of claim 1, wherein the beamforming sounding feedback information comprises compressed beamforming report information, and the second beamforming feedback matrix is carried by the compressed beamforming report information.

3. The method of claim 1, wherein the at least one predetermined system-parameter-to-matrix mapping rule is implemented with a predetermined database comprising a plurality of predetermined system-parameter-to-matrix mapping relationships between respective candidate values of the plurality of system parameters and the plurality of predetermined unitary rotation matrices.

4. The method of claim 3, wherein the plurality of predetermined system-parameter-to-matrix mapping relationships indicate statistical results with regard to a plurality of predetermined channel models.

5. The method of claim 1, wherein the other device is arranged to act as a beamformer in the wireless communications system, and the wireless transceiver device is arranged to act as a beamformee in the wireless communications system.

6. A wireless transceiver device, for performing beamforming sounding feedback in a system-parameter-aware manner, the wireless transceiver device being one of multiple devices within a wireless communications system, the wireless transceiver device comprising:

a processing circuit, arranged to control operations of the wireless transceiver device; and a communications control circuit, coupled to the processing circuit, arranged to perform communications control, wherein the communications control circuit is arranged to perform wireless communications operations with another device among the multiple devices for the wireless transceiver device;

wherein:

the wireless transceiver device is arranged to check a plurality of system parameters of the wireless communications system to generate a plurality of checking results of the plurality of system parameters, respectively, wherein any checking result among the plurality of checking results indicates a current value of a corresponding system parameter among the plurality of system parameters, and the plurality of system parameters comprise one or a combination of a number of spatial streams (NSS), a modulation and coding scheme (MCS), and a data rate;

the wireless transceiver device is arranged to modify a first beamforming feedback matrix according to the plurality of checking results to generate a second beamforming feedback matrix, wherein:

based on at least one predetermined system-parameter-to-matrix mapping rule, the wireless transceiver device is arranged to perform a mapping operation on the plurality of checking results to determine a selected unitary rotation matrix among a plurality of predetermined unitary rotation matrices, wherein the selected unitary rotation matrix is selected from the plurality of predetermined unitary rotation matrices; and the wireless transceiver device is arranged to modify the first beamforming feedback matrix according to the selected unitary rotation matrix to generate the second beamforming feedback matrix; and the wireless transceiver device is arranged to send beamforming sounding feedback information carrying the second beamforming feedback matrix to the other device within the wireless communications system, for further processing of the other device.

7. The wireless transceiver device of claim 6, wherein the beamforming sounding feedback information comprises compressed beamforming report information, and the second beamforming feedback matrix is carried by the compressed beamforming report information.

8. The wireless transceiver device of claim 6, wherein the at least one predetermined system-parameter-to-matrix mapping rule is implemented with a predetermined database comprising a plurality of predetermined system-parameter-to-matrix mapping relationships between respective candidate values of the plurality of system parameters and the plurality of predetermined unitary rotation matrices.

9. The wireless transceiver device of claim 8, wherein the plurality of predetermined system-parameter-to-matrix mapping relationships indicate statistical results with regard to a plurality of predetermined channel models.

10. The wireless transceiver device of claim 6, wherein the other device is arranged to act as a beamformer in the wireless communications system, and the wireless transceiver device is arranged to act as a beamformee in the wireless communications system.

* * * * *